United States Patent [19]
Yang

[11] Patent Number: 6,028,404
[45] Date of Patent: Feb. 22, 2000

[54] MOTOR DRIVE CIRCUIT SYSTEM UTILIZING MULTIPLE DC POWER DRIVING DEVICES SWITCHABLE BETWEEN PARALLEL, AND SERIES/PARALLEL COMBINATIONS

[76] Inventor: Tai-Her Yang, No. 32 Lane 29, Taipin St., Si-Hu Town, Dzan-Hwa, Taiwan

[21] Appl. No.: 08/866,346

[22] Filed: May 30, 1997

[51] Int. Cl.⁷ .................................................. H02P 1/54
[52] U.S. Cl. .......................... 318/111; 318/51; 318/112; 318/113
[58] Field of Search ....................... 318/34–112

[56] References Cited

U.S. PATENT DOCUMENTS

| | | | |
|---|---|---|---|
| 3,638,718 | 2/1972 | Illg | 165/287 |
| 3,800,197 | 3/1974 | Mehta | 318/93 |
| 3,828,233 | 8/1974 | Brulard | 318/87 |
| 4,363,999 | 12/1982 | Preikschat | 318/53 |

*Primary Examiner*—David Martin
*Attorney, Agent, or Firm*—Bacon & Thomas

[57] ABSTRACT

At least two components that use DC power to drive at least two motors, such as DC armatures, field windings, etc., collectively referred to as DC driving devices, are connected together by switching components which can be operated to selectively connect the driving devices either in parallel or series or, in the case of more than two DC driving components, in mixed parallel and series configurations. The switching components can be solid state or electromagnetic switching components, including components that have variable resistances so as to allow continuously variable control of the series/parallel connections between the elements, and can be switched by modulation of control or trigger pulses. When the DC power driving devices are in the form of DC armatures, the series and/or parallel connection effects can also be further modulated by shunt field control of the armature currents.

5 Claims, 2 Drawing Sheets

6,028,404

MOTOR DRIVE CIRCUIT SYSTEM UTILIZING MULTIPLE DC POWER DRIVING DEVICES SWITCHABLE BETWEEN PARALLEL, AND SERIES/PARALLEL COMBINATIONS

BACKGROUND OF THE INVENTION

DC or AC synchronous motors using DC auxiliary exciting magnetic poles are widely applied in driving machines or industrial equipment as well as in driving various electrical carriers or public transportation carriers due to their low cost, good operating performance, high efficiency, and ease of control. Conventionally, switching between multiple series and parallel combined motors is highly reliable with good effect, as is usually seen in the speed control of railed electrical cars. However, such conventional speed controls can only provide multi-stage changes in series, parallel or mixed combinations, but not continuous linear control. Although the intermediate discontinuous sections can be adjusted by variable resistors, the resistors have high heat loss as well as a negative effect on the electromechanical characteristics. Therefore, a need exists for a circuit which possesses a good continuous adjustment between the stages of series, parallel, or mixed series and parallel combinations, as well as economic efficiency and a good structure, using solid state active control components to eliminate the disadvantages of short life and high cost of the conventional series and parallel switching electromechanical components.

SUMMARY OF THE INVENTION

To overcome the above-mentioned problems, the invention provides a driving circuit system that includes multiple DC power driving devices for conventional DC or AC motors in series, parallel, and mixed series and parallel combinations. The DC power driving devices, including armatures or field windings, of the conventional AC or DC synchronous motors (or DC alternator type motors) are controlled in series or parallel combinations of stages, the combinations being continuously controlled to, for example, switch between series and parallel combinations and thereby control the rotation speed, turning torque and output power of the motors.

More specifically, the driving circuit system of the invention is applied to multiple DC power driving devices for DC or AC motors in mixture of series and parallel combinations, and includes:

A DC power source which may include any devices for converting mechanical or chemical energy into electric power, such as batteries, solar cells or generators, as well as any other rectified AC power sources;

A DC power driving device for two or more than two independent motors, two or more than two field windings, or two or more than two armatures of the same motor which are to be controlled by switching components in order to switch between series and parallel combinations, or to proportionally mix the series and parallel combinations, the controlled power driving device being made up of armatures of DC electrical machines with permanent magnet type DC motors or shunt type DC motors with excited winding type fields, or series excited windings and/or armatures of series excited or commutator winding type compound excitation electrical machines, or the series field windings or armatures of series excited motors, and individually controlled, commonly controlled, constituted by other alternator type motors, or constituted by AC or DC synchronous motors with DC auxiliary excitation fields;

Switching components are comprised of solid state switching components, linearly controllable solid state switching components, or electromechanical type switching components in particular situations or a mixture of both;

A diode for controlling current distribution polarity, or for functioning as a flywheel diode;

An operating control input unit constituted by electromechanical or solid state electronic components for issuing operating commands and control motor operating status;

A central control unit is a command signal processing unit constituted by electromechanical or solid state electronic components for receiving operating commands from the command input unit to control the switching components through the driving circuit.

Through ON/OFF switching control of the switching components, the DC power driving devices of the controlled motors control changeover between series or parallel combinations, and through pulse width modulation of (PWM) control of the switching components the DC power driving devices infinitely modulate the intermediate stages between the series and parallel combinations and the mixture of both combinations. In addition, in the case of switching components with controllable internal resistors, an infinite, stage-less control operation can also be achieved.

DETAILED DESCRIPTION OF THE PREFERRED EMBODIMENTS

Figure 1:
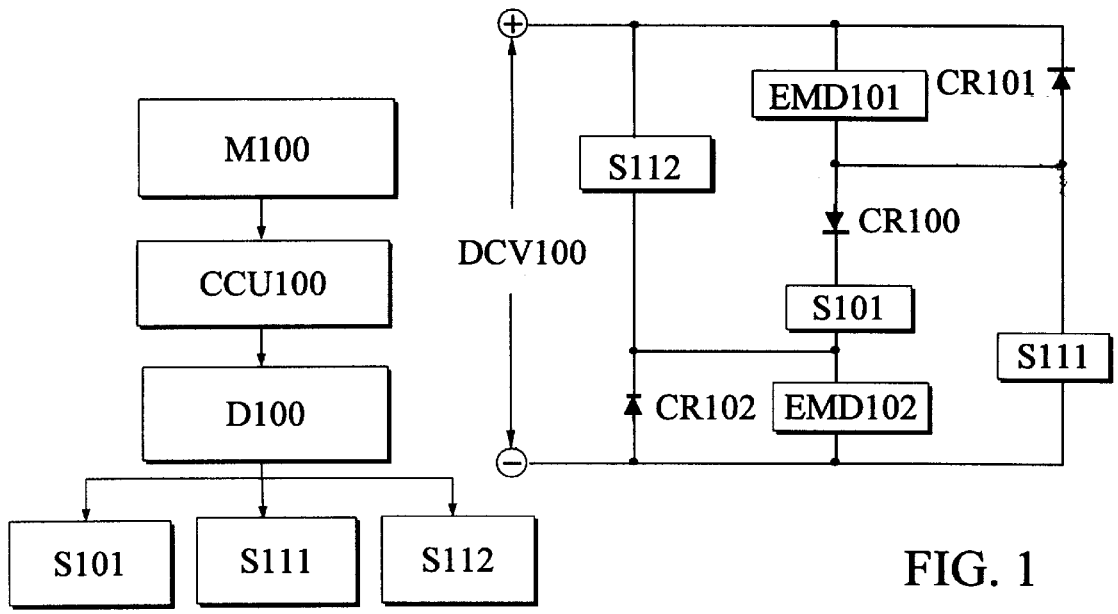
FIG. 1 is a schematic diagram of an exemplary two stage type circuit which illustrates the principles of the invention.

FIG. 1 is a two stage circuit that illustrates the basic principles of the invention. The driving circuit system of FIG. 1 includes multiple DC power driving devices for DC or AC motors in mixtures of series and parallel combinations, as follows:

Power is provided by a DC power source DCV100 which may include any devices for converting mechanical or chemical energy into electric power, such as batteries, solar energy cells, generators, or any other rectified AC power sources.

DC power driving devices EMD101, EMD102 for the controlled motors are constituted by two or more than two independent motors, two or more than two field windings, or two or more than two armatures of the same motor which are to be controlled by switching components to form series or parallel combinations, or to proportionally mix series or parallel combinations, each controlled power driving device being comprised of armatures of DC electrical machines such as permanent magnet type, DC shunt type, DC series type, or DC compound type electrical machines having field windings or armatures that are individually or commonly controlled. Alternatively, the devices may include the auxiliary DC excitation field windings of alternator type motors or AC or DC synchronous motors.

Switching components S01, S111, S112 are comprised of solid state switching components, linearly controllable solid state switching components, electromechanical type switching components in particular situations, or combinations of such components. The switching component S101 and diode CR100 are series combined between the DC power driving devices EMD101 and EMD102 to be used as an isolation diode, the order of series combination being power source positive terminal→EMD101 positive terminal→END101 negative terminal→CR100 positive terminal→CR100 negative terminal→S101 positive terminal→S101 negative terminal→EMD101 positive terminal→EMD102 negative terminal→power source negative terminal.

Diodes CR100, CR101, CR102 are series combined in the direction of current flow between the DC power driving device EMD101 of the controlled motor and the switching component S101 to function as a isolation diode. Diode CR101 is parallel combined between the two ends of the DC power driving device EMD101 of the controlled motor to function as a flywheel diode, with its positive terminal being connected to the intersecting point of the DC power driving device EMD101 of the controlled motor and the switching component S111, while its negative terminal and the positive terminal of the DC power driving device EMD101 of the controlled motor are connected together to the positive terminal of the power source. Similarly, diode CR102 is parallel combined with the two ends of the DC power driving device EMD102 of the controlled motor to function as a flywheel diode, with its negative terminal being connected to the intersecting point between the DC power driving device EMD102, and the switching components S112 and S101, and its positive terminal is connected to the intersecting point between the negative terminal of the power source, the DC power driving device EMD102 of the controlled motor and the switching component S111.

Operating control input unit M100 is made up of electromechanical or solid state electronic components arranged to transmit operating commands input by a user for controlling motor operating status.

Central control unit CCU100 is a command signal processing unit made up of electromechanical or solid state electronic components for receiving operating commands from the command input unit M100 to control the switching components through the driving circuit D100.

Driving circuit D100 includes electromechanical, solid state and electromechanical, or electronic components for receiving commands from the central control unit CCU100 to drive the switching components.

The operating states of the driving circuitry can include all or part of the following states:

A) When the switching component S101 is in an "ON" state and S111, S112 are "OFF", the DC power driving devices EMD101 and EMD102 of the controlled motors are in the high impedance, low power operating condition of series combination, and the electric current flows from the positive terminal through EMD101→CR100→S101 →EMD102→negative terminal;

B) When the switching component S101 is in an "OFF" state (although due to the reverse barrier effect of the diode CR100, an "ON" status would also work), and S111, S112 are "ON", the DC power driving devices EMD101 and EMD102 of the controlled motors are in the low impedance, high power operating condition of parallel combination, and the electric current is divided into two loops: (a) through the positive terminal→S112→S102→negative terminal and (b) through the positive terminal →EMD101→S111→negative terminal respectively, each loop executing power control on the DC power driving device of the controlled motor independently to thereby control the rotating speeds, torque values, currents or rotating directions of the respective motors for operation synchronized or independent operation, with some of the motors at standstill.

To provide the functions stated in items (A) and (B) above, the switching components can be comprised of electromechanical switching components or solid state switching components arranged so that when the switching components S101, S111, S112 are all "OFF", the motor operation is stopped.

C) When the component S101 is "ON", a conduction cycle PWM control of the solid state switching components S111, S112 can be effected to switch continuously between series and parallel combinations, so that the power rate can be continuously adjusted from series combination to parallel combination according to the PWM duty cycle.

D) If the switching components S111 and S112 include internal resistor controlled solid state linear components, then their operating power rate can be continuously controlled to provide linear adjustment from series combination to parallel combination.

E) By using a group of motors made up of shunt excited field winding DC motors and controlling speed through field control, the intervals between the various operating power rate stages can be filled in to obtain the characteristics of continuous linearly adjusted torque or rotating speed values.

For the aforesaid control application, the switching component S101 can be selected as follows:

(A) Component S101 may be directly short-circuited without hindering system operations, (B) Component S101 may be comprised of electromechanical or solid state switching components to allow the motor to stop operation when S101, S111, S112 are all in an "OFF" state;

(C) Component S101 may be comprised of solid state switching components which, besides contributing to overall switching functions together with S111, S112, the S101, can also perform a PWM control function of the motors operated in series combinations for power rate variations of the motors from standstill to mutual series combinations.

(D) If S101, S111 and S112 are all comprised of solid state components capable of performing linear control, then besides providing overall switching functions for motors operated in series combination, switching component S101 can be linearly operated to control the operating states of motors for power rate variations from standstill to mutual series combinations.

(E) Components S111 and S112 in parallel combination status can be used to provide PWM or linear driving control of the two motors for different operating power rates respectively.

Based on the aforesaid basic circuit operation, the following practical applications are possible:

The current directions of the DC power driving devices of the controlled motors can be simultaneously switched by a direction change switch to thereby change the rotating direction;

The system can be enlarged to include more than two motors, with appropriate switching components and diodes, enlarging number of series to parallel combinations, that can be made, including mixtures of series and parallel combinations.

The types and electromechanical characteristics of the motors can be the same or different, and selectable as required.

The relationship between each motor and the load can be such that the load is commonly driven by the motors while each motor is combined by a common shaft or through transmission components, or each individual load can be driven by each individual motor.

Figure 2:
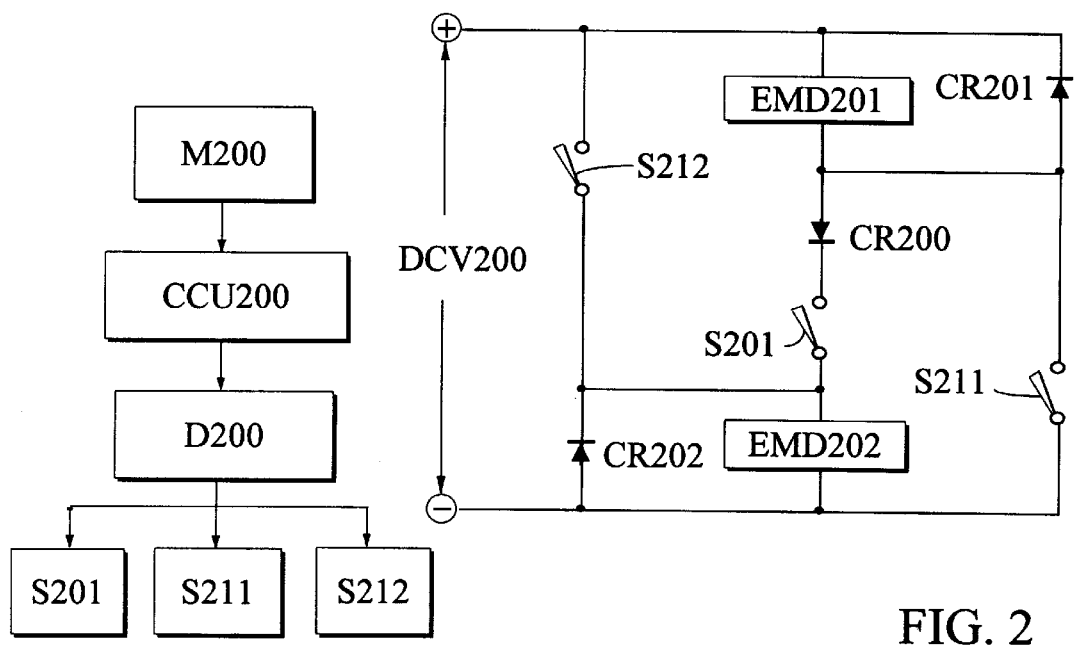
FIG. 2 is a schematic diagram illustrating the use of electromechanical switches to form a series combined control circuit according to a preferred embodiment of the invention.

FIG. 2 is a two stage circuit that illustrates the basic principles of the invention. The driving circuit system of FIG. 2 includes multiple DC power driving devices for DC or AC motors in mixtures of series and parallel combinations, as follows:

Power is provided by a DC power source DCV200 which may include any devices for converting mechanical or chemical energy into electric power, such as batteries, solar energy cells, generators, or any other rectified AC power sources.

DC power driving devices EMD201, EMD202 for the controlled motors are constituted by two or more than two independent motors, two or more than two field windings, or two or more than two armatures of the same motor which are to be controlled by switching components to form series or parallel combinations, or to proportionally mix series or parallel combinations, each controlled power driving device being comprised of armatures of DC electrical machines such as permanent magnet type, DC shunt type, DC series type, or DC compound type electrical machines having field windings or armatures that are individually or commonly controlled. Alternatively, the devices may include the auxiliary DC excitation field windings of alternator type motors or AC or DC synchronous motors.

The switching components S201, S211, S1212 are driven manually, by electromagnetic force, by mechanical power, or fluid power. Switching component S201 is installed between the negative terminal of diode CR200 and the DC power driving device EMD202 of the controlled motor. One terminal of the switching component S211 and the positive terminal of the diode CR201 are commonly connected with the intersecting point between the DC power driving device EMD201 of the controlled motor and the positive terminal of the diode CR200, while the other terminal of the switching component S211 is connected to the negative terminal of the power source. One terminal of the switching component S212 and the negative terminal of the diode CR202 are commonly connected with the intersecting point between the DC power driving device EMD202 of the controlled motor and the switching component S201, while the other terminal of the switching component S212 is connected to the positive terminal of the power source.

Diode CR200 can be installed or omitted according to operating requirements, while the negative terminal of the diode CR201 is connected with DC power driving device EMD201 of the controlled motor and the positive terminal of the power source. The positive terminal of the diode CR201, the switching component S211, the DC power driving device EMD201 of the controlled motor, and the positive terminal of the diode CR200 are all commonly connected. The negative terminal of the diode CR202 is connected with the positive terminal of the DC power driving device EMD202, while the positive terminal of the diode CR202 is connected with the negative terminal of the power source.

Operating control input unit M200 is made up of electromechanical or solid state electronic components arranged to transmit operating commands input by a user for controlling motor operating status.

Central control unit CCU200 is a command signal processing unit made up of electromechanical or solid state electronic components for receiving operating commands from the command input unit M200 to control the switching components through the driving circuit D200.

Driving circuit D200 includes electromechanical, solid state and electromechanical, or electronic components for receiving commands from the central control unit CCU200 to drive the switching components.

Figure 3:
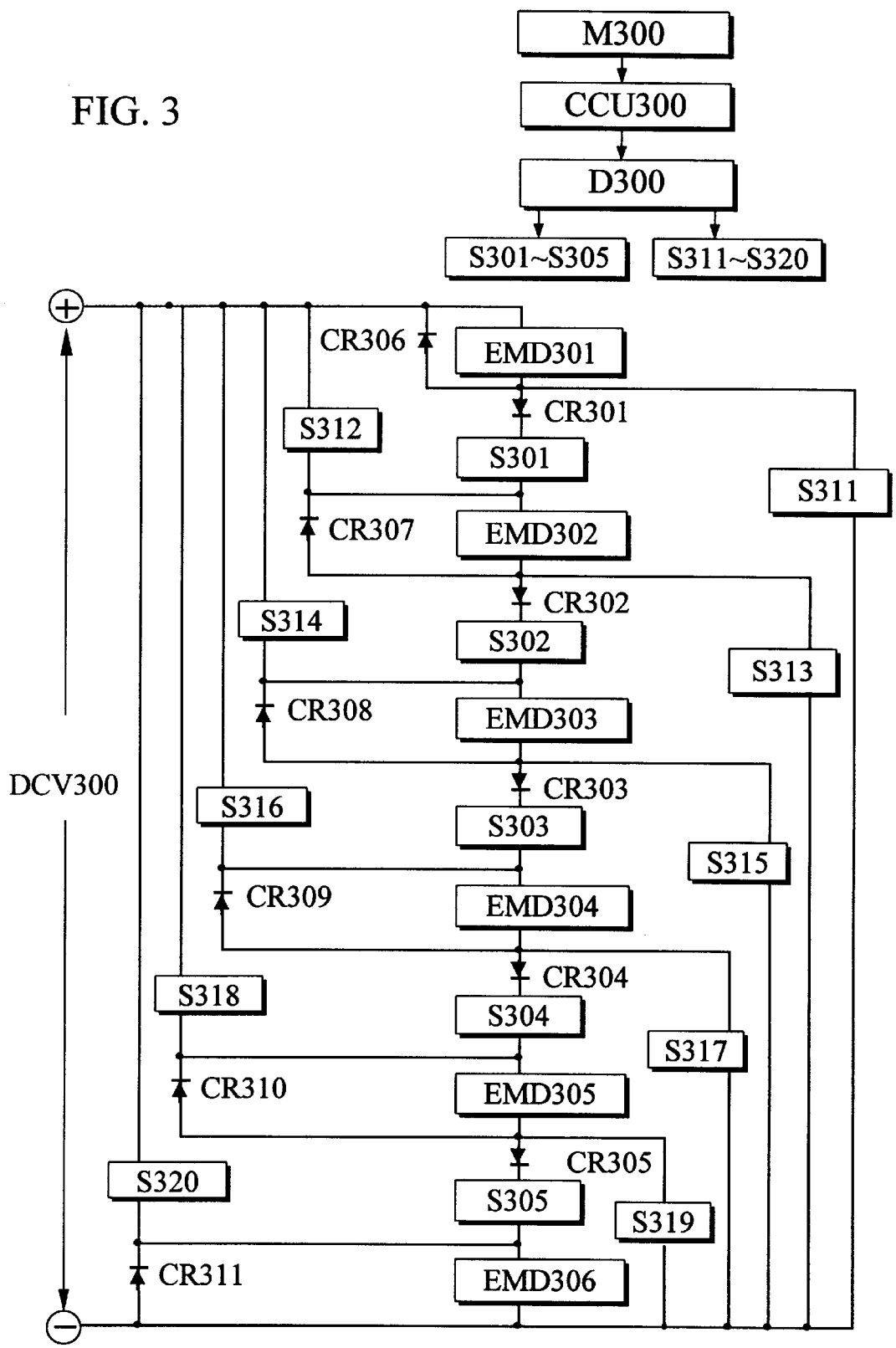
FIG. 3 is a schematic diagram of an implementation of the invention including six DC power driving devices of the controlled motors.

FIG. 3 shows a driving circuit system constituted by multiple DC power driving devices for DC or AC motors in mixtures of series and parallel combinations, including six DC power driving devices for the controlled motors. Application examples include series combinations, parallel combinations or series and parallel combinations of multiple motors, as follows:

Power is provided by a DC power source DCV300 which may include any devices for converting mechanical or chemical energy into electric power such as batteries, solar energy cells, generators, or any other rectified AC power sources.

DC power driving devices EMD301, EMD302, and EMD303 for the controlled motors are constituted by two or more than two independent motors, two or more than two field windings, or two or more than two armatures of the same motor which are to be controlled by switching components to form series or parallel combinations, or to proportionally mix series or parallel combinations, each controlled power driving device being comprised of armatures of DC electrical machines such as permanent magnet type, DC shunt type, DC series type, or DC compound type electrical machines having field windings or armatures that are individually or commonly controlled. Alternatively, the devices may include the auxiliary DC excitation field windings of alternator type motors or AC or DC synchronous motors. Switching components S301–S305, diodes CR301–CR305, and DC power driving devices EMD301–EMD306 of the controlled motors are series combined in the same way as previously described with respect to the corresponding elements in FIGS. 1 and 2.

The switching component S313 is cross connected between the negative terminal of the DC power driving device EMD302 and the negative terminal of the power source.

The switching component S315 is cross connected between the negative terminal of the power driving device EMD303 of the controlled motor and the negative terminal of the power source.

The switching component S317 is cross connected between the negative terminal of the power driving device EMD304 of the controlled motor and the negative terminal of the power source.

The switching component S319 is cross connected between the negative terminal of the power driving device EMD305 of the controlled motor and the negative terminal of the power source.

The switching component S312 is cross connected between the positive terminal of the power driving device EMD305 of the controlled motor and the positive terminal of the power source.

The switching component S314 is cross connected between the positive terminal of the power driving device EMD303 of the controlled motor and the positive terminal of the power source.

The switching component S316 is cross connected between the positive terminal of the power driving device EMD304 of the controlled motor and the positive terminal of the power source.

The switching component S318 is cross connected between the positive terminal of the power driving device EMD305 of the controlled motor and the positive terminal of the power source.

The switching component S320 is cross connected between the positive terminal of the power driving device EMD306 of the controlled motor and the positive terminal of the power source.

Diodes CR306–CR311 are respectively parallel combined with the two terminals of each armature of the DC power driving devices EMD301–EMD306 in reverse polarity with the power source to serve as flywheel diodes. The negative terminal of diode CR306 is connected with the positive terminal of EMD301, while the positive terminal of diode CR306 is connected with the negative terminal of EMD301.

The negative terminal of diode CR307 is connected with the positive terminal of the DC power driving device EMD302, while the positive terminal of CR307 is connected with the negative terminal of the DC power driving device EMD302.

The negative terminal of diode CR308 is connected with the positive terminal of EMD303, while the positive terminal of CR308 is connected to the negative terminal of EMD303.

The negative terminal of diode CR309 is connected with the positive terminal of EMD304, while the positive terminal of CR309 is connected with the negative terminal of EMD304.

The negative terminal of diode CR310 is connected with the positive terminal of EMD305, while the positive terminal of CR301 is connected with the negative terminal of EMD305.

The negative terminal of diode CR311 is connected with the positive terminal of EMD306, while the positive terminal of CR311 is connected to the negative terminal of EMD306.

Operating control input unit M300 is made up of electromechanical or solid state electronic components arranged to transmit operating commands input by a user for controlling motor operating status.

Central control unit CCU300 is a command signal processing unit made up of electromechanical or solid state electronic components for receiving operating commands from the command input unit M300 to control the switching components through the driving circuit D300.

Driving circuit D300 includes electromechanical, solid state and electromechanical, or electronic components for receiving commands from the central control unit CCU300 to drive the switching components.

The operating states of the example shown in FIG. 3 includes the following:

(A) When switching components S301–S305 are "ON" and S311–S320 are "OFF", driving devices EMD301–EMD306 are series combined to commonly connect with the power source and the controlled motors are at the highest impedance and lowest power rate operating state.

(B) When switching components S301, S302, S304, S305, S315 and S316 are "ON" and S303, S311–S314, and S317–S320 are "OFF", driving devices EMD301–EMD303 are mutually series combined and then are parallel combined with the power source, so that the controlled motors are at a low power rate operating state.

(C) When the switching components S301, S303, S305 and S313, S314, S317, S318 are all "ON" and S302, S304, S311, S312, S315, S316, S319, S320 are "OFF", the DC power driving devices EMD301 and EMD302 are mutually series combined and then parallel combined with the power source so that the controlled motors are in an intermediate power rate operating state;

(D) When the switching components S301–S305 are "OFF" and S311–S320 are "ON", then each motor is individually parallel combined with the power source, and the controlled motors are at the largest power consumption operating state.

The continuous linear operations of the aforesaid staged power operating states (A) through (D) can be achieved by the following methods:

The respective switching components for the respective operating states:

(A) lowest power rate operating state, (B) second to lowest power rate operating states, (C) middle power rate operating status, and (D) largest power rate operating status may be alternated to proportionally switch between the states, thereby achieving the characteristics of intermediate continuously adjusted torque or rotation speed values during operation.

The aforesaid solid state switching components may be replaced by linear power components for continuously adjusting the operating torque or rotation speed value between the two different operating power stages analytically.

The motors may be constituted by DC motors with shunt excited winding fields, the shunt fields being controlled to control speeds and fill in the intervals between the aforesaid different operating power rate stages, thereby achieving the characteristics of continuous linearly adjusted torque or rotation speed values during operation.

Based on the principles illustrated in the aforesaid examples, through arrangements and combinations of the various switching components and motor circuits, all or part of the following functions can be obtained as needed:

F1: The motors can be caused to rotate in one direction, and the series combination switched to a parallel combination directly.

F2: The motors can be caused to rotate in one direction and the series combination is gradually switched to a parallel combination at the largest power rate by using pulse width modulation.

F3: The motors can be caused to rotate unidirectionally and a linear series combination is gradually switched to a parallel combination at the largest power rate.

F4: The motors can be caused to rotate unidirectionally and gradually switched from standstill to a parallel combination at the largest power rate through pulse width modulation, in addition to the series to parallel combination switching operations.

F5: The motors can be operated unidirectionally and gradually switched from standstill to a parallel combination at the largest power rate through control by the switching components as well as by the series to parallel combination switching operations.

F6: For bidirectional motor and generator operating functions, the motors or generators may be gradually switched from standstill to parallel combination at the largest power rate by pulse width modulation.

F7: For bidirectional motor and generator operating functions, the motors or generators may be gradually switched from standstill to parallel combination at the largest power rate through the control of linear components.

F8: For unidirectional rotations controlled by series and parallel combinations, each motor can be operated independently.

F9: For bi-directional rotations controlled by series and parallel combinations, each motor can be operated independently.

F10: AC alternator type motors may be controlled by the bi-directional switching components to be gradually switched from standstill to parallel combinations at the largest power rate.

F11: AC alternator type motors may be controlled by the bi-directional linear switching components to gradually switch from standstill to parallel combinations at the largest power rate.

F12: For a generator operated in reverse unidirectional rotation, the series combination may be switched to parallel combination directly;

F13: For a generator operated in reverse unidirectional rotation, gradual switching to a parallel combination at the largest power rate may be controlled by pulse width modulation.

F14: For a generator operated in reverse unidirectional rotation, gradual switching to a parallel combination at the largest power rate may be controlled by the linear components.

F15: Multiple types of series and parallel combinations can be used for common factor combinations.

F16: For motors operated in unidirectional rotation, the solid state switching components or linear components may be further combined with field control arrangements to control rotation speeds, torque values, or currents of the respective motors for parallel operation with the same or different performance characteristics or with some motors at a standstill.

F17: For motors operated in bidirectional rotation, the solid state switching components or linear components may be further combined with field control arrangements to control rotation speeds, torque values, or currents of the respective motors for parallel operation having the same or different performance characteristics or with partial motors at a standstill.

In addition, in case the DC power control device is an armature, the field excitation strength of the controlled motor can be controlled for combination use to further extend the application range of the invention.

As summarized from the above description, a driving circuit system made up of multiple DC power driving devices for DC or AC motors in various of series and parallel combinations is, through a particular innovative circuit structure, provides a simple way of switching or mixing the series and parallel combinations to provide a variety of practical control functions.

I claim:

1. A driving circuit system for at least two electrical motors, comprising:

at least two driving devices arranged to drive the at least two motors, said at least two driving devices being connected to each other and to a DC power source by a series connection and by a parallel connection, said series connection including a first solid state switching component and said parallel connection including a second solid state switching component, and a control device for causing said first and second solid state switching components to switch between a state in which said driving devices are series connected and a state in which said driving devices are parallel connected wherein said control device operates said switching components by pulse width modulation, an overall power consumption of the motors being controlled by varying widths of pulses applied to the switching components, and therefore the duty cycle by which the system is switched back and forth between series and parallel connections.

2. A driving circuit system as claimed in claim 1, wherein a number of said driving devices is at least three, each of said at least three driving devices being connected to all others of said at least three driving devices by a series connection and a parallel connection including one of said solid state switching components, wherein said control device is arranged to cause said solid state switching components to switch between a state in which all said driving devices are series connected, a state in which all said driving devices are parallel connected, and states in which some of said driving devices are series connected and some of said driving devices are parallel connected to vary a gross power of operation.

3. A driving circuit system as claimed in claim 1, wherein said driving devices include excitation field windings and armatures of DC series excitation motors.

4. A driving circuit system as claimed in claim 1, wherein said driving devices include armatures for controlling and driving DC motors.

5. A driving circuit system as claimed in claim 1, wherein said driving devices are field windings of AC motors.

* * * * *